J. HUGHES.
AIR BRAKE SYSTEM.
APPLICATION FILED MAY 27, 1908.

918,675.

Patented Apr. 20, 1909.

WITNESSES:
J. Ray Abbey
Ralph S. Warfield

INVENTOR
John Hughes
BY
Geo. B. Willcox
ATTORNEY

UNITED STATES PATENT OFFICE.

JOHN HUGHES, OF JACKSON, MICHIGAN.

AIR-BRAKE SYSTEM.

No. 918,675.

Specification of Letters Patent.

Patented April 20, 1909.

Application filed May 27, 1908. Serial No. 435,319.

*To all whom it may concern:*

Be it known that I, JOHN HUGHES, a citizen of the United States, residing at Jackson, in the county of Jackson and State of Michigan, have invented certain new and useful Improvements in Air-Brake Systems; and I do hereby declare the following to be a full, clear, and exact description of the invention, such as will enable others skilled in the art to which it appertains to make and use the same.

My invention relates to improvements in air brake systems, adapted for use in connection with the systems now employed and applicable to mountain travel as well as general conditions.

One object is the provision of means for automatically maintaining the auxiliary reservoir on each car charged at all times.

Another object is the provision of means whereby the full pressure from the main reservoir may be applied to the brake cylinder. As a result a higher brake pressure is afforded than is now obtainable.

Still another object is the provision of means whereby the valve controlling the communication between the auxiliary reservoir and the brake cylinder is made more sensitive to reductions of pressure in the main train line.

A further object is the separation of the brake operating pressure and the pressure operating the valve.

A still further and highly important object is the provision of means whereby the auxiliary reservoir is recharged while and during the time when the brakes are set.

Another object is the equalization of the braking pressure throughout the entire train.

Still another object is the provision of means for regulating the braking pressure upon the empty cars in a train.

A further object is the provision of means whereby the brakes remain set in an emergency application until the engineer moves his valve to running position, even though there may be a leak in the line.

A still further object is the saving of wear and tear on the air pump.

Another object is the provision of means whereby the valve may be caused to operate several times in succession without the loss of any appreciable amount of air.

Still another object is that the use of retainers now generally employed to retain a small pressure in the brake cylinders, is obviated.

A further object is the provision of means whereby the pressure in the main train line is reduced thereby avoiding the usual strain on the hose and the consequent reduction of the liability of leakage.

To these and other ends therefore, my invention consists in certain novel features and combinations such as will be more fully described hereinafter and particularly pointed out in the claims.

In the accompanying drawings.

As is well known the present air brake system is defective in that the engineer cannot make an emergency application of the brakes immediately after having released the brakes because of the loss of air and the consequent reduction of pressure in the several auxiliary reservoirs. Also inexperienced engineers are very liable to waste the air in making service applications of the brakes so that it requires considerable work on the part of the air pump to recharge the auxiliary reservoirs. Furthermore, in all systems with which I am familiar it is absolutely impossible for the air pump to recharge the auxiliary reservoirs during the time when the brakes are applied or set. Again, the valve mechanisms now employed consist of many complicated parts which are very liable to get out of order because of sand or other extraneous material which has lodged in the main train line or for other causes. Furthermore, it will be understood that when adjusting the brake system to the cars, the brakes are so hung that the pressure exerted against the wheels is sufficient to retard and stop the movement of the car when empty. This adjustment of the brakes to an empty car is made because if the brakes were applied too strongly they would lock the wheels and cause the empty car to slide, flattening the wheels and operating on slippery rails to accelerate rather than retard the progress of the car. In view of such loss in braking power it is obvious that in mountain travel particularly, great danger cannot be avoided especially when it is considered that a freight train may consist of from fifty to ninety or more cars.

My invention is designed to overcome the foregoing disadvantages by supplying means whereby the engineer can apply the full braking pressure to the wheels of a train. On the other hand it would be inadvisable to apply the same braking pressure to an empty as is applied to a loaded car and therefore I have devised means for regulating the braking pressure.

Another disadvantage of the present air brake systems resides in the fact that if a heavy pressure is maintained in the main train line (as is required in mountain travel) leaks are very apt to develop especially in the hose connecting adjacent cars and should such leakage occur, the brakes will be applied or "creep on" when the engineer does not wish to slow down or stop. In my invention, the liability of leakage in the main train line is very much reduced because it is only necessary to carry a comparatively low pressure therein.

Another fruitful source of complaint is that in a long main train, the reduction of air in the train line to make a service application for instance, will not be felt at the rear end of the train. That is to say, the reduction of pressure at such rear end will be so slight as to fail to operate the valve and hence the momentum of the rear cars will not be affected and their weight will press against the forward cars rendering it difficult to stop the train. It is also of frequent occurrence that a small leak at any point between the auxiliary reservoir and the brake cylinder when the brakes are set, will permit the air to leak out of the brake cylinder and release the brakes on that car. This occurrence is rendered absolutely impossible in my invention as leakage of air cannot affect the set of the brakes when a heavy application of the air pressure is made. In the brake systems now in common use the pump cannot recharge the auxiliary reservoirs while the brakes are set because the auxiliary reservoirs are connected to the train line through the valves. This renders it necessary for the pumps to work very rapidly after the brakes are released in order to bring the pressure up to the required degree as soon as possible. My invention reduces the wear and tear and strain on the pumps because the latter may be recharging the auxiliary reservoirs while the brakes are set.

Figure 1:
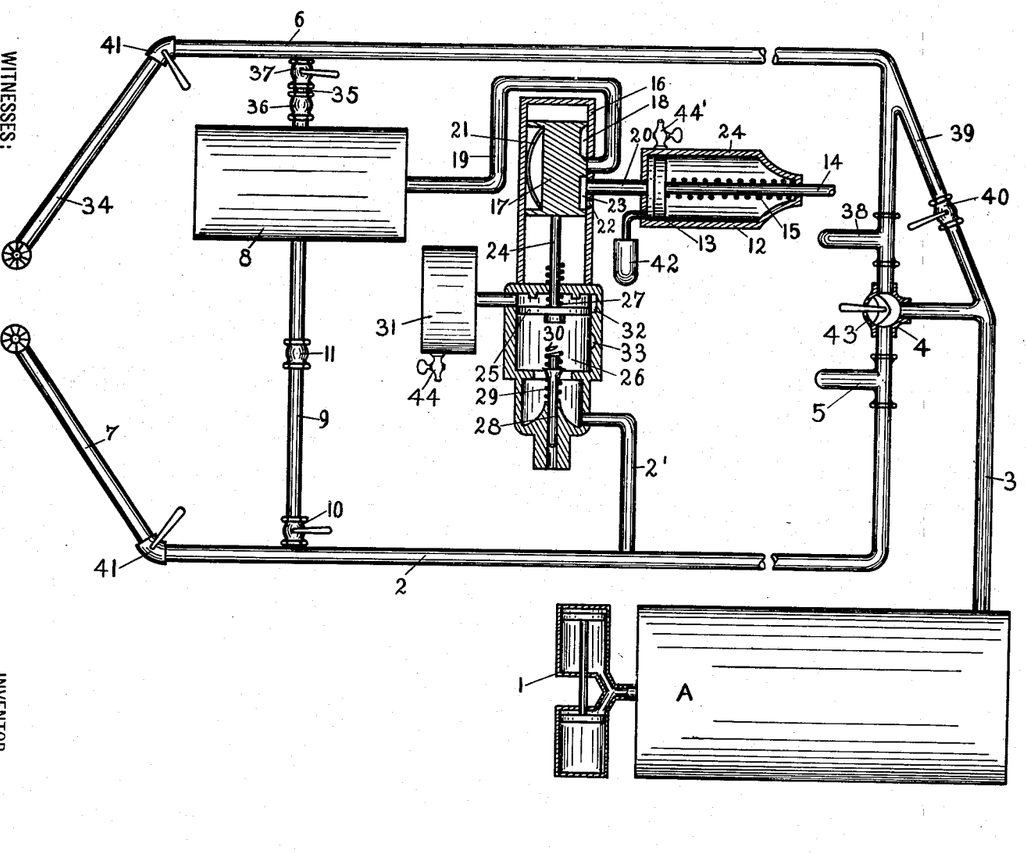
Figure 1 is a plan view illustrating one arrangement embodying my invention.

Referring now to the drawings, A indicates the usual main reservoir to which the air pump 1 is connected.

A main train line 2 is connected with the main reservoir by means of the pipe 3, the usual engineer's valve 4, being interposed between the main train line 2 and its supply pipe 3. A feed valve 5 of any of the usual types is located in the main train line, such feed valve being adjusted to admit air up to any predetermined pressure to the main train line.

My invention consists in the provision of an auxiliary train line 6 in communication at all times with the main reservoir and unaffected by the operation of the engineer's valve, such auxiliary train line being combined with coöperating features also forming a part of my invention.

Returning to the main train line 2, such line extends the length of the train in the usual manner, the sections on adjacent cars being coupled together by hose connections 7. An auxiliary reservoir 8 such as is carried by each car is directly connected to the main train line 2 by a branch pipe 9 in which is located a cut off cock 10 and a valve 11 adapted to permit the air to enter the auxiliary reservoir, but preventing its escape back through the branch pipe.

A brake cylinder 12 on each car is provided with a piston 13 and rod 14 in the usual manner, such rod being encircled by a spring 15 normally tending to retain the brake cylinder piston at its inner limit of movement, and the brakes released.

Interposed in the connection between the auxiliary reservoir and the brake cylinder is a valve chamber 16 closed at each end and containing a valve 17 provided with a port 18 adapted to register with and connect the pipes 19 and 20 leading from the auxiliary reservoir and to the brake cylinder respectively.

Communication through the pipes 19 and 20 is normally closed when the engineer's valve is in "running" position. The pipes are connected to the valve chamber, and in order to retain the valve on its seat and compensate for wear I provide a spring 21 interposed between the valve and the wall of the chamber. Other valve constructions may be used in place of that shown.

The valve chamber is provided with an exhaust opening 22 leading preferably to the atmosphere. An exhaust port 23 formed in the valve normally affords communication between the brake cylinder pipe 20 and the exhaust port 22, when the engineer's valve is in "running" position to permit air in the brake cylinder to exhaust to the atmosphere and release the brakes. This normal position of the exhaust port also prevents the possibility of the brakes "creeping on" in case of a leak around the valve should one occur.

The valve is equipped with a stem 24 passing through one end of the valve chamber and connected with a piston 25 in the piston chamber 26. It must be borne in mind that there is absolutely no communication for air between the piston chamber and the valve chamber. A spring 27 encircles the valve stem 24 within the piston chamber and behind the piston 25.

A graduating stem 28 is seated in that end of the piston chamber opposite the piston 25, such stem being yieldingly supported in extended position by a spring 29, and adapted to be engaged by the piston when an emergency application of the brakes is made. The graduating stem at its outer end may carry a supplementary spring 30 lighter than the spring 29. Spring 30 extends beyond the end of the graduating stem to be engaged and compressed by the piston 25 during a service application of the brakes, instead of compressing the main spring 29. The spring 30 may be omitted in other constructions embodying the invention.

In order to supply sufficient pressure to operate the piston when the pressure in the main train line is reduced, I provide an air-tight piston auxiliary reservoir 31 in communication with the piston chamber on that side of the piston 25 opposite the graduating stem, and as one means for supplying the piston auxiliary reservoir with air, I provide a supply or feed port 32 in the interior periphery of the piston chamber which permits air to pass around the piston 25. Such port is however, normally closed by the piston in a manner hereinafter set forth, when the engineer's valve is in "running" position.

As one means for permitting the pressure of air on both sides of the piston to equalize when a service application of the brakes is made I provide the piston chamber with an equalizing groove or port 33 which in the present instance, is located adjacent that end of the chamber wherein the graduating valve is situated, the operation of which will be set forth in detail. The main train line is connected to the piston chamber 26 by a pipe 2'. The auxiliary train line 6 extends throughout the length of the train in the same manner as does the main train line 2, the sections being coupled by hose connections 34.

A branch pipe 35 connects each auxiliary reservoir directly with the auxiliary train line, such pipe having a cut off valve 36 and a check valve 37 therein. The auxiliary train line is provided with a feed valve 38 adjacent the engineer's valve which is adjusted to admit any predetermined pressure to the auxiliary train line. It will be seen from the drawing that the normal function of the main line is to supply air to the piston auxiliary reservoir and to reduce the air pressure in the piston chamber. Hence, a comparatively low pressure may be carried in the main train line with a consequent reduction in the liability of leakage. The auxiliary train line, however, must supply the auxiliary reservoirs with air at braking pressure, say 80 pounds or even higher on passenger trains, and hence the feed valve 38 must be set to allow the auxiliary train line to carry a higher pressure than the main train line. In order to provide for emergency applications, however, I arrange a by-pass 39 between the main reservoir and the auxiliary train line, around the engineer's valve and the feed valve 38, such by-pass being controlled by a by-pass valve 40. By this means I can instantly throw the entire pressure in the main reservoir, say 110 pounds into each of the auxiliary reservoirs in the train. Both the main and auxiliary train lines are equipped with angle cocks 41 to shut off the air on the last car of the train, in the usual manner.

In the present air brake systems, the air hose on the last car is allowed to hang down, as a result of which sand, dirt, gravel or other extraneous material finds its way into the hose and when the car is again coupled up in a train, such material is driven throughout the system and seriously affects the efficiency of the valves as well as clogging the line. In my invention, the free ends of the air hose for the main and auxiliary lines may be coupled together thereby preventing the entrance of extraneous material as well as retaining the free ends of the hose above the road bed out of danger of injury.

The operation of my invention is as follows: Assume that the train is moving and the auxiliary reservoirs are charged. The engineer's valve is in its "running" position at which time the main train line is in communication with the main reservoir and the pistons 25 are remote from the graduating stems. Also the communication between the pipes 19 and 20 is closed and communication between pipes 20 and the respective exhaust ports 22 is open, the parts being in the positions shown in the drawings. The engineer desiring to make a service application of the brakes will move his valve to "service" position which movement of the valve cuts off the communication between the main reservoir and the main train line 2 and opens the main train line to the atmosphere through a port 43 in the engineer's valve, thus allowing some of the air in the main train line to exhaust into the atmosphere. The exhaust of air into the atmosphere reduces the pressure in the main train line, thereby permitting the then higher pressure in each of the air tight piston auxiliary reservoirs 31 to force the pistons 25 in the piston chambers against the light springs 30 carried by the graduating stems 28. The movement of the pistons is communicated to the valves 17, drawing the latter along in their chambers until the valve ports 18 register with and connect the open ends of the pipes 19 and 20 thereby admitting air from the auxiliary reservoirs 8, into the brake cylinders 12, the pressure of air against the pistons in the brake cylinders operating to set the brakes. Meanwhile the engagement of the pistons 25 with the light springs 30 operates to compress the latter and permit the pistons 25 to uncover the by-pass equalizing ports 33 allowing the higher pressure in the piston auxiliary reservoirs to pass around the pistons 25 and equalize with the reduced pressure in the main train line.

When this is accomplished the tension of the springs 30 asserts itself and forces the pistons away from the ports 33 and thus prevents further leakage from the piston auxiliary reservoirs. This equalization of air pressure consumes but very little time because the air in the piston auxiliary reservoirs has to fill the space above the pistons when the latter are moved to their outward positions and the piston auxiliary reservoirs lose but little air in the process. On the other hand, when the pistons 25 are moved back to normal position, the air is forced back into the piston auxiliary reservoirs thereby raising their pressure. The backward thrusts imparted to the pistons 25 by the springs 30 operate to move the valves back to prevent communication between the pipes 19 and 20 by moving the ports 18 out of register with the pipes 20 thus locking the pressure in the brake cylinders. The communication afforded by the valve between the auxiliary reservoir and the brake cylinder during a service application is maintained for a limited time only, because the comparatively small reduction in main train line pressure will quickly permit the equalization around the piston between the piston auxiliary reservoir and the main train line, thereby allowing the spring 30 to return the piston to lap position, which movement of the piston will return the valve to lap position to lock the pressure in the brake cylinder and prevent the further admission of pressure thereto. The engineer watching his air gage, observes that sufficient air, say 5 pounds, has been allowed to escape from the main train line whereupon he moves the valve 4, to "lap" position (providing he wishes to hold the brakes set and make a full stop). When the engineer's valve is in "lap" position no air can escape from the main train line nor can any air enter the main train line from the main reservoir A.

When the engineer desires to release the brakes without making a full stop he moves his valve from "service" to "running" position at which time the exhaust of air from the main train line ceases and the main reservoir is placed in communication with the main train line to raise the pressure therein to the predetermined point at which the feed valve 5 is set. The entrance of air into the main train line when the engineer's valve is returned to "running" position, raises the pressure in the main train line to a point above the pressure furnished by the piston auxiliary reservoirs behind the pistons 25. Consequently, the pistons are forced back to their normal inward positions and communicate motion to the respective valves which are likewise returned to normal position bringing the exhaust ports 23 into register with the brake cylinder pipes 20 and exhaust openings 22 to permit the air in the brake cylinders to escape, whereupon the springs 15 return the brake cylinder pistons to their inner positions to release the brakes. The pressure of the air in the main train line forces the pistons 25 backward until the supply ports 32 in the piston chambers are uncovered to permit the higher pressure of the main train line to equalize with the pressure in the piston auxiliary reservoirs, thereby replenishing the latter. The movement of the pistons 25 to such position as to uncover the supply ports 32 causes the pistons to compress the springs 27 so that when the pressure on both sides of the pistons equalizes, the springs force the pistons forward just far enough to clear the supply ports and prevent communication between the piston auxiliary reservoirs and the main train line. The advantage of this arrangement is that it makes the pistons more sensitive to reductions of pressure in the main train line. In long trains the ordinary reduction of pressure in the main train line is not sufficient on the rear cars to cause the operation of the pistons. In my construction, should the supply ports 32 be normally open, the air in the piston auxiliary reservoirs would leak through the ports without operating the pistons under the same conditions. But by closing said supply ports any reduction of pressure in the main train line will cause the pistons 25 on the rear cars of a long train to be operated.

The opening of communication between the pipes 19 and 20 when the brakes are to be set permits a portion of the air in the auxiliary reservoirs 8 to exhaust into the brake cylinders 12 thereby reducing the pressure in the auxiliary reservoirs and in the auxiliary train line which, it will be remembered, is always in communication with the main reservoir. The consequent reduction of pressure in the main reservoir at once sets the air pump to working and the air in the main reservoir and consequently in the auxiliary train line and the auxiliary reservoirs is brought up to the required pressure while the brakes are set. This is impossible in all prior constructions with which I am familiar because the air is admitted to the auxiliary reservoirs through the triple valves whereas in my invention there is a complete separation of the air used for braking pressure and the air used to operate the valves, nor does the air for supplying the auxiliary reservoirs 8 pass through the valves. The most important advantage is that the auxiliary reservoirs are always charged with air so that at any time the engineer can set the brakes, even immediately after having released the air from the previous stop. Another advantage is that the retainers now in general use to hold a low pressure in the brake cylinders are not necessary. These retainers are a great source of trouble. They frequently become clogged thereby retaining a considerable pressure in the brake cylinders and rendering it impossible to fully release the brakes. Furthermore, inexperienced train hands hearing the sound of escaping air therefrom think the mechanism is wrong and close or partially close the valves governing the amount of air to be carried in the brake cylinders, with the same result.

In my invention should the braking mechanism on one or more cars be out of order all that is necessary is to shut the cut off valves in the branch pipes 9 and 35 supplying the auxiliary reservoir 8 which does not affect the braking pressure on the other cars. Furthermore, in case of accident to the auxiliary train line all that is necessary is to shut off the air therefrom, the auxiliary reservoir 8 then being supplied from the branch pipes 9 leading from the main train line. In such an event the feed valve 5 controlling the pressure in the main train line is adjusted to allow a higher pressure to be carried therein because normally the main train line carries a lower pressure than the auxiliary train line. Another great advantage residing in my construction is that in a heavy or an emergency application of the brakes the brake cylinder is kept filled with air even though it may leak, because the pump is constantly forcing air directly into the auxiliary reservoirs the moment the pressure in the main reservoir decreases.

In making an emergency or a heavy application of the brakes, the engineer will throw the valve 4 to its farthest limit of movement opening the exhaust port 43 to its widest possible extent and closing communication between the main reservoir pipe 3 and the main train line 2. The sudden reduction in pressure in the main train line causes the pressure in the piston auxiliary reservoirs to act with rapidity. The pistons 25 are forcibly driven against the graduating stems 28, depressing the latter against the tension not only of the light springs 30 if employed but also of the heavier springs 29. This movement of the pistons carries them past the equalizing ports 33 so that no air from the piston auxiliary reservoirs can leak around into the train line. Simultaneously with the movement of the pistons, the valves are moved so that the auxiliary reservoirs 8 are in communication with the brake cylinder pipes. If the occasion seems to demand it, the engineer may also open the controlling cock 40 in the by-pass 39 leading from the main reservoir directly to the auxiliary train line around the feed valve 38 thereby throwing the entire pressure of the main reservoir into the auxiliary reservoirs 8 and brake cylinders. The air pump 1 commences to pump air into the main reservoir as soon as the pressure therein is reduced so that the predetermined full pressure is maintained even though leaks may occur. The valve controlling communication between the auxiliary reservoir and the brake cylinder will remain in its open position during an emergency application, so long as the pressure above the piston is greater than the air pressure in the main train line assisted by the springs 29 and 30, but when the main train line pressure is raised, the valve is returned to release position.

The brake cylinders are equipped with any of the usual styles of reducers 42 to prevent the brakes from setting so hard against the wheels as to lock the latter and cause the car to slide. The brakes are released as hereinbefore described.

In making up a train, it is considered the better plan to couple all empties at the rear end of the train because they do not require so great a brake pressure as the loaded cars. To insure that the brakes shall be applied with less force on the empties in the rear I preferably couple a reducing valve similar to feed valves 5 and 38 between the empty and loaded cars, such a reducing valve being of any convenient construction to permit it to be engaged by the adjacent hose couplings in the auxiliary train line between the loaded and empty cars. When the train is made up with loaded and empty cars interposed, the train hands can turn the cut off cocks 37 in the branch pipes 35 thus permitting the auxiliary reservoirs 8 of the empty cars to be supplied from the low pressure or main train line 2, only.

A great practical advantage attained by the use of my invention may be illustrated as follows: Assume that a train of mixed loaded and empty cars is equipped with my invention. The auxiliary train line is charged to 100 pounds pressure and the main train line to 70 pounds. The auxiliary reservoirs of the empty cars are supplied with air from the main train line only, consequently the auxiliary reservoirs on the empty cars are charged to 70 pounds and the auxiliary reservoirs on the loaded cars to 100 pounds. It will be understood that the admission of 20 pounds of air from the large auxiliary reservoir into the smaller brake cylinder creates a braking pressure of 50 pounds. In traveling down steep grades, it is necessary to utilize every pound of brake pressure possible, especially on heavy trains. Now, in my invention, a 20 pounds reduction in the main train line will permit 20 pounds of air from the auxiliary reservoirs of the empty and loaded cars to enter the brake cylinders. This pressure on the empty cars will equalize into the brake cylinders at 50 pounds because of the smaller area of the brake cylinders. The admission of 20 pounds of air from the auxiliary reservoirs of the loaded cars into the brake cylinders will leave a pressure of 80 pounds in the auxiliary reservoir of such loaded cars. This pressure is raised by the entrance of air from the auxiliary train line to 100 pounds again. In order to utilize the pressure stored in the auxiliary reservoirs of the loaded cars, it is possible in my invention to make a further reduction of pressure in the main train line which will cause the valves on the loaded cars to open, admitting further braking pressure to the brake cylinders of such loaded cars, it being obvious that the pressure in the brake cylinders can be raised to equalize with the pressure in the auxiliary train line. Thus, after the brakes are once set, as by a reduction of 20 pounds, a sudden further reduction in the pressure in the main train line of 10 pounds will cause the valves to move rapidly past the equalizing ports 33 and maintain the communication open between the auxiliary reservoirs and brake cylinders of all the cars. This will not injure the train as the brakes have already been set and the slack taken out.

In present air brake systems wherein the pressure of air is equalized in the auxiliary reservoirs and in the train lines, a reduction of 10 pounds in the train line results in the admission of 10 pounds from the auxiliary reservoir to the brake cylinder and the size of the communication between the auxiliary reservoir and the brake cylinder is of no importance. If restricted, the triple valve will remain in open position a longer time than if the communicating opening is large, but only ten pounds of air will enter the brake cylinder in any event. In my invention, the size of the equalizing port 33 controls the amount of pressure entering the brake cylinder from the auxiliary reservoir and a ten pound reduction in the main train line with a small equalizing port through which the air on opposite sides of the piston would equalize slowly, might allow 100 pounds of air to enter the brake cylinder.

My invention can be applied to any of the well known braking systems now in use with but a minimum of trouble and expense. It will be observed that the piston auxiliary reservoir might be dispensed with by making the piston chamber longer, its only function being to contain sufficient air to operate the piston a number of times successively without recharging. Also other changes might be made in the form and arrangement of the several parts described without departing from the spirit and scope of my invention.

The equalization of the braking pressure throughout the entire train is of great importance. In the systems now in use, the brake pistons have what is termed long or short travel, that is, the brake cylinder piston of one car may move seven inches to apply the brakes or it may have to be moved a distance of eleven inches. The brake pistons on the several cars may have various lengths of travel. The auxiliary reservoirs are all charged with say 80 pounds of air, irrespective of the length of travel of the brake pistons. Now when the valve is operated to open communication between the auxiliary reservoir and the brake cylinder, the air in the former rushes into the cylinder and equalizes with the pressure of air in the auxiliary reservoir. Thus if the brake cylinder piston must move seven inches the braking pressure is higher than in a cylinder wherein the piston must move eleven inches to apply the brakes.

In my invention owing to the fact that the main reservoir is in constant communication with the auxiliary reservoirs, up to eighty pounds, the moment the pressure in the auxiliary reservoirs drops below eighty pounds, the feed valve 38 opens to admit air to the auxiliary train line and consequently the pressure of air is raised to eighty pounds in the auxiliary reservoirs and in the brake cylinder as well. Hence it will be seen that I obtain a much higher braking pressure than is now obtainable, which higher braking pressure offsets the loss occasioned by the displacement of the brakes on a loaded car.

A very important advantage of my invention may be explained as follows: Formerly in trains where the loaded cars are in front and the empties are behind, the reduction of pressure in the main train line to cause a service application of the brakes will cause the air to equalize in the auxiliary reservoirs and brake cylinders of the empties at a high pressure, say 50 pounds, because, owing to the manner of hanging the brakes, the brake pistons on the empty cars do not have so far to travel before applying the brakes as do the brake pistons on the loaded cars. On the loaded cars, the reduction of pressure in the main train line will cause the air in the auxiliary reservoir to equalize in both the brake cylinder and auxiliary reservoirs at a pressure of, say 45 pounds on a 100,000 capacity car, because the weight of the car has displaced the brake mechanism relative to the wheels. It is obvious therefore, that although a single reduction of pressure in the main train line may have been made, there is less braking pressure on the loaded cars than on the empty cars and it is necessary therefore, when releasing the brakes, to raise the pressure in the valves on the rear empty cars higher than will be necessary in the valves on the forward loaded cars because the counter balancing pressure on the forward loaded cars need not be as great. In the present example, the pressure must be raised in the main train line from 45 pounds to 51 pounds and over before the brakes on the empty cars will be released, but the increase of pressure in the main train line above 45 pounds will release the brakes on the forward loaded cars. Furthermore, as soon as the brakes on the forward loaded cars are released, the auxiliary reservoirs on those cars (in former air brake systems) will at once grab or accumulate the air in the main train line, thereby preventing it from traveling back to the empty rear cars until the auxiliary reservoirs on the loaded cars in front have been recharged to or a trifle above 50 pounds. Owing to this faulty operation, the engineer must sometimes hold his train 10 or 15 minutes before starting ahead in order to permit the pressure in the train line to increase sufficiently to release the brakes on the empty cars. Should he start ahead before the brakes on the empty cars are released, he will very likely pull his train apart owing to the strain on the draw bars between the loaded and empty cars. Although many devices have been invented in an attempt to automatically regulate the brake pressure through the difference in the load, such means have been inefficient to thoroughly meet all conditions.

In my invention, the air in the auxiliary reservoir on the loaded cars is at a higher pressure (say 110 pounds) than in the empty cars, wherein the pressure is at, say 70 pounds. This is owing to the interposition of the feed valve between the loaded and empty cars in the auxiliary train line. Now, although in applying the brakes, the pistons in the brake cylinders on the loaded cars must travel farther than those on the empty cars, the higher pressure in the auxiliary reservoirs on the loaded cars admits a greater amount of air to the brake cylinders of the loaded cars than will be admitted to the brake cylinders of the empty cars. The equalization of the higher pressure carried by the loaded cars in the brake cylinders and auxiliary reservoirs will offset the additional length of travel required on the loaded cars and hence, the braking pressure will be equalized throughout the train. Heretofore, the brakes on the empty cars are the first to be set and the last to release. The ideal condition is to apply the brakes simultaneously or release the brakes simultaneously throughout the entire train. This condition is practically attained by the use of my invention because the pressure in the piston auxiliary reservoirs tends to prevent the immediate release of the brakes on the loaded cars, thus permitting a greater amount of air in the main train line to travel back to the empty cars and equalize in the piston chambers of the empty cars to release the brakes. The auxiliary reservoirs on the loaded cars in front cannot rob the main train line of air because, owing to the provision of the auxiliary train line, the auxiliary reservoirs have been recharged and the pressure in such auxiliary reservoir is higher than in the main train line. The pressure in the main train line is in effect equalized throughout the length of the train, because the main train line has no connection with the brake pressure line. This separation of the valve controlling air pressure from the brake pressure constitutes the main idea of my invention and by so isolating these two air pressures I am able to work the brakes automatically first and after by actuating the by-pass valve 40 to introduce straight air pressure directly into the brake cylinders through the auxiliary reservoir. Formerly, it was impossible to operate an air brake system both automatically and as a straight air brake too.

Another feature of my invention resides in the provision of bleeding cocks 44 and 44' on the piston auxiliary and brake cylinder respectively. It will be understood that in switching cars one or more may be "kicked" onto a side track, the angle cocks 41 having been closed and the hose connections disengaged prior to the switching operation, thus locking the air pressure in the train lines and auxiliary reservoirs on the cars so switched. The brakeman instead of climbing on the side tracked cars to set the hand brakes will turn the angle cocks to reduce the pressure in the train line and set the brakes. It is some times inconvenient to couple onto the side tracked cars so that when it is desired to release the brakes, a bleeding cock on the auxiliary reservoir is opened thereby reducing the pressure in the brake cylinder providing communication between the brake cylinder and auxiliary reservoir is open. If it is closed, and there is not enough air to make an emergency application, nothing is left but to couple on and recharge the main train line to release the brakes. In my invention under the same conditions, the brakeman merely has to operate the bleeding cock 44 on the piston auxiliary providing a service application has been made, which operation will permit the air in the main train line to operate the valve and release the air in the brake cylinder. If the pressure in the main train line is too low, however, the brakeman can then operate the bleeding cock 44' on the brake cylinder to release the air therefrom.

Having thus fully disclosed my invention, what I claim as new is:—

1. An air brake system comprising an auxiliary reservoir, a source of air under pressure directly connected thereto, a brake cylinder, a valve chamber, a valve in the chamber controlling the communication between the auxiliary reservoir and the brake cylinder and between the latter and the atmosphere, a piston chamber air tight relative to the valve chamber, a low pressure train line communicating with the piston chamber, a piston operating in the chamber, means for storing air on one side of the piston, the piston chamber provided with means for supplying air to the storage means and for permitting the air in the storage means to equalize with the air in the low pressure train line, and means for controlling the pressure in said train line.

2. An air brake system having an auxiliary reservoir in direct communication with a source of air under pressure, a piston chamber closed against the supply of air to the auxiliary reservoir, a piston operating in the chamber, a piston auxiliary reservoir containing air under pressure on one side of the piston, a train line communicating with the piston chamber on the other side of the piston, and means controlling the pressure of air in the train line.

3. In an air brake system, the combination with an auxiliary reservoir, a brake cylinder in communication therewith, and a valve mechanism interposed in the communication, of a train line communicating with and controlling the actuation of the valve mechanism, a main reservoir, an auxiliary train line directly connecting the main and auxiliary reservoirs, a feed valve in the auxiliary train line, a by-pass around the feed valve and a cock controlling the by-pass.

4. In an air brake system, the combination with a main reservoir, an auxiliary reservoir, a brake cylinder, a communication between the auxiliary reservoir and brake cylinder, and a valve mechanism interposed in such communication, of a train line communicating with the main reservoir and the valve mechanism, an engineer's valve and a feed valve located in the train line between the main reservoir and the valve mechanism, a constantly charged auxiliary train line in constant communication with the main reservoir and the auxiliary reservoir, a branch pipe connecting the first named train line with the auxiliary reservoir, and cut-off cocks controlling the communication between the main and auxiliary train lines and the auxiliary reservoir.

5. An air brake system having a main reservoir, an auxiliary reservoir, separate train lines leading from the main reservoir, branch pipes connecting the respective train lines directly with the auxiliary reservoir, and a cut-off cock in at least one of the branch pipes.

6. An air brake system comprising an auxiliary reservoir, a brake cylinder in communication therewith, a valve mechanism controlling such communication, a main reservoir, means controlling the actuation of the valve mechanism, a constantly charged auxiliary train line independent of the valve-controlling means and in constant communication with the main and auxiliary reservoirs and normally containing less pressure than that in the main reservoir, and means for admitting the entire pressure in the main reservoir to the auxiliary train line.

7. An air brake system comprising an auxiliary reservoir, a brake cylinder, a communication therebetween, a valve chamber and valve interposed in the communication, a piston chamber air-tight relative to the valve chamber, a piston in the piston chamber, a stem connecting the piston and valve, the piston chamber having a supply port and an equalizing port, a spring acting upon the piston to normally retain the supply port covered, and means adapted to be engaged by the piston when a service application is made for retaining the equalizing port covered.

8. A valve mechanism for air brake systems comprising a valve controlling communication between the auxiliary reservoir and the brake cylinder, a piston chamber, a piston in the chamber, the chamber provided with supply and equalizing ports spaced apart from each other, means connecting the piston and valve, a source of air pressure connected with the piston chamber on one side of the piston, the supply port adapted to equalize the pressure on both sides of the piston, means for causing the piston to close the supply port when the pressure is equalized, means for reducing the pressure on one side of the piston whereby the air pressure behind causes it to uncover the equalizing port, and means for causing the piston to close the equalizing port when the pressure on both sides of the piston is again equalized.

9. A valve mechanism for air brake systems comprising a valve controlling communication between the auxiliary reservoir and the brake cylinder, a piston chamber, a piston in the piston chamber, means for introducing pressure to the piston chamber on one side of the piston, a yieldingly supported graduating stem, means connecting the valve and piston, the piston chamber provided with an equalizing port and a supply port, the latter adapted to equalize the pressure on both sides of the piston, a spring for causing the piston to normally close the supply port, means for reducing the pressure on one side of the piston to cause the latter to uncover the equalizing port, and means engaged by the piston when it uncovers the equalizing port for causing the valve to close such equalizing port when the pressure on both sides of the piston is again equalized.

10. A valve mechanism for air brake systems comprising a valve controlling communication between the auxiliary reservoir and the brake cylinder, a piston chamber, a piston in the piston chamber, a source of pressure communicating with the piston chamber on one side of the piston, a storage chamber communicating with the piston chamber on the opposite side of said piston, the piston chamber provided with supply and equalizing ports for permitting the equalization of pressure on opposite sides of the piston when the pressure is unbalanced, and means engaged by the piston for operating the latter to close the ports when the pressure is equalized.

11. An air brake system comprising a main reservoir, an auxiliary reservoir, a brake cylinder, a valve chamber, pipes leading from the auxiliary reservoir and from the brake cylinder to the chamber, the chamber provided with an exhaust opening, a valve in the chamber controlling communication between the brake cylinder and the auxiliary reservoir and between the brake cylinder and the exhaust opening, a piston chamber, a piston located in the piston chamber, a valve stem connecting the valve and piston, a spring interposed between the piston and one end of its chamber, a piston auxiliary reservoir communicating with the piston chamber on one side of the piston, the piston chamber provided with a supply port for by-passing air around the piston valve to the piston auxiliary reservoir when the brakes are first released, a graduating stem projecting into the piston chamber, a spring supporting the stem in extended position, a second spring seated on the stem and projecting beyond the outer end thereof, the piston chamber provided with an equalizing port adjacent the graduating stem, a low pressure train line communicating with the main reservoir and with the piston chamber, an engineer's valve in the low pressure train line, an auxiliary train line in constant communication with the main and auxiliary reservoirs respectively, a feed valve interposed in the auxiliary train line, a by-pass from the main reservoir to the auxiliary train line around the feed valve, and a cock controlling the passage of air through the by-pass.

12. In an air brake system, the combination with a main reservoir, an auxiliary reservoir, a brake cylinder, and means connecting the auxiliary reservoir and the brake cylinder, of a valve chamber in the connecting means, a valve in the chamber, a piston chamber, a piston in the piston chamber, means connecting the valve and piston, a train line communicating with the piston chamber on one side of the piston, a connection between the train line and the auxiliary reservoir, the piston chamber provided with supply and equalizing ports to permit the pressure in the piston chamber to equalize on both sides of the piston when the latter is at one limit of its movement or is in its service position, and means for automatically moving the piston to close the ports when the pressure is equalized.

13. In an air brake system, the combination with a main reservoir, an auxiliary reservoir, a brake cylinder in communication therewith, and a valve controlling communication between the auxiliary reservoir and the brake cylinder, of a piston chamber, a piston in the piston chamber, the piston connected to the valve, a train line communicating with the piston chamber, the piston chamber provided with means for equalizing the air pressure on opposite sides of the piston, and bleeding cocks on that side of the piston opposite the train line, and on the brake cylinder respectively.

14. An air brake system comprising a main reservoir, a main train line leading therefrom, a brake cylinder, an auxiliary reservoir communicating therewith, a valve controlling such communication, a piston chamber, a piston in the piston chamber, the piston controlling the actuation of the valve, the main train line communicating with the piston chamber and with the auxiliary reservoir respectively.

15. An air brake system comprising a main reservoir, an auxiliary reservoir, a brake cylinder in communication therewith, a valve mechanism including a piston chamber and piston for controlling such communication, means for conducting air under pressure to the auxiliary reservoir and to the piston chamber on one side of the piston, and a storage reservoir communicating with the piston chamber on the opposite side of the piston, the chamber provided with means for permitting communication around the piston when the latter is in one or the other of two positions.

16. An air brake system having an auxiliary reservoir, a main reservoir, a constantly charged auxiliary train line directly connecting the auxiliary and main reservoirs to recharge the former during the application of the brakes, a main train line, and means connecting the main train line and the auxiliary reservoir.

17. An air brake system having an auxiliary reservoir, a constantly charged high pressure and a low pressure train line, separate from each other, a brake cylinder, a valve controlling the communication between the auxiliary reservoir and the brake cylinder, and a piston for operating the valve, the piston actuated by the decrease or increase in pressure in the low pressure train line, the air pressure being normally equalized on opposite sides of the piston.

18. An air brake system comprising a main and an auxiliary reservoir, a brake cylinder, a valve controlling the communication between the auxiliary reservoir and the brake cylinder, an air pressure-actuated piston for operating the valve, the air pressure normally equalized on opposite sides of the piston, a main train line for normally maintaining air pressure against the piston, a pipe connecting the main train line and the auxiliary reservoir, and separate means in constant communication with the main reservoir for maintaining pressure in and recharging the auxiliary reservoir.

19. An air brake system having an auxiliary reservoir, a brake cylinder, a valve mechanism controlling the communication between the auxiliary reservoir and the brake cylinder, a main reservoir, a low pressure train line for actuating the valve mechanism, and a second constantly charged high pressure train line separate from the first named train line and connecting the auxiliary reservoir directly with the main reservoir at all times.

20. An air brake system comprising a brake cylinder, an auxiliary reservoir, a constantly open connection between the auxiliary reservoir and a source of compressed air, a slide valve for opening and closing communication between the auxiliary reservoir and the brake cylinder and between the latter and the atmosphere, a piston chamber, a piston in the chamber adapted to actuate the valve, and a train line leading to the piston chamber, the piston chamber provided with means for permitting the air pressure to equalize around the piston.

21. An air brake system comprising an auxiliary reservoir, a main reservoir directly connected thereto, a brake cylinder, a valve controlling communication between the auxiliary reservoir and the brake cylinder, a piston chamber, a low pressure train line communicating therewith, a piston in the chamber, means for storing air on that side of the piston opposite the communication with the low pressure train line, the piston chamber provided with means for normally equalizing the pressure of air on opposite sides of the piston, and means for controlling the pressure in said train line.

22. An air brake system comprising an auxiliary reservoir in direct communication with a source of air under pressure, a piston chamber closed against the supply of air to the auxiliary reservoir, a piston in the chamber, a piston auxiliary reservoir on one side of the piston and adapted to contain air under pressure, a train line communicating with the piston chamber on the opposite side of the piston, the chamber provided with means for permitting an equalization of air pressures on opposite sides of the piston when the latter is at one limit of its movement.

23. An air brake system comprising an auxiliary reservoir, a brake cylinder, a valve chamber with which the auxiliary reservoir and the brake cylinder communicate, a valve in the chamber controlling the communication between the auxiliary reservoir and the brake cylinder, a constantly charged high pressure train line in direct communication with the auxiliary reservoir, a piston chamber, a piston in the chamber connected with the valve, a low pressure train line communicating with the piston chamber, and a web dividing the piston and valve chambers from each other.

24. An air brake system having an auxiliary reservoir, a constantly charged high pressure and a low pressure train line separate from each other, the high pressure train line in constant communication with the auxiliary reservoir, and a valve mechanism with which the low pressure train line communicates, the fluctuation in pressure in the low pressure train line operating to actuate the valve mechanism controlling communication between the auxiliary reservoir and the brake cylinder.

25. An air brake system comprising a main and an auxiliary reservoir, a brake cylinder, a valve controlling communication between the auxiliary reservoir and the brake cylinder, a piston chamber, a piston in the piston chamber, the piston connected to the valve, a main train line communicating with the piston chamber on one side of the piston, the piston chamber having a by-pass controlled by the piston for admitting pressure to the opposite side of the piston to maintain the brakes released normally, the variation in pressure in the train line constituting the means actuating the valve, and means independent of the main train line and in constant communication with the main reservoir for maintaining pressure in and automatically recharging the auxiliary reservoir as soon as the pressure therein is reduced.

26. An air brake system having an auxiliary reservoir in direct communication with a source of air under pressure, a piston chamber, a train line communicating with the piston chamber, the latter closed against the supply of air to the auxiliary reservoir, a piston operating in the chamber, a piston auxiliary reservoir independent of the auxiliary reservoir and containing air under pressure on one side of the piston, the train line communicating with the piston chamber on the other side of the piston and separated from the communication between the auxiliary reservoir and the source of compressed air, and means controlling the pressure of air in the main train line.

27. An air brake system comprising a main reservoir, an auxiliary reservoir, a brake cylinder, a high pressure train line leading from the main reservoir directly to the auxiliary reservoir, a valve controlling communication between the auxiliary reservoir and the brake cylinder, a piston chamber, a piston in the chamber, the piston connected to the valve, and a low pressure train line communicating with the piston chamber and adapted to vary the pressure therein to positively actuate the valve by air pressure in either direction.

28. An air brake system comprising a main reservoir, an auxiliary reservoir, a brake cylinder connected to the auxiliary reservoir, a valve controlling such connection, a high pressure train line connecting the main and auxiliary reservoirs, a piston chamber, a piston in the chamber, the piston connected to the valve, a low pressure train line communicating with the piston chamber on one side of the piston, a piston auxiliary reservoir independent of the auxiliary reservoir and communicating with the piston chamber on the opposite side of the valve, the chamber having a by-pass controlled by the piston for admitting air from the low pressure train line to the piston auxiliary reservoir.

In testimony whereof, I affix my signature in presence of two witnesses.

JOHN HUGHES.

Witnesses:
RALPH S. WARFIELD,
NELLIE M. ANGUS.